US012458756B2

(12) United States Patent
Bhuvanesh Kulkarni et al.

(10) Patent No.: US 12,458,756 B2
(45) Date of Patent: Nov. 4, 2025

(54) STOPPER FOR A MEDICAL INJECTION DEVICE (71) Applicant: Becton Dickinson France, Le Pont de Claix (FR)

(72) Inventors: Pooja Bhuvanesh Kulkarni, Pune (IN); Frédéric Michel, Rives (FR); Guillaume Lehee, Voreppe (FR)

(73) Assignee: Becton Dickinson France, Le Pont de Claix (FR)

( * ) Notice: Subject to any disclaimer, the term of this patent is extended or adjusted under 35 U.S.C. 154(b) by 580 days.

(21) Appl. No.: 17/912,077

(22) PCT Filed: Mar. 16, 2021

(86) PCT No.: PCT/EP2021/056630
§ 371 (c)(1),
(2) Date: Sep. 16, 2022

(87) PCT Pub. No.: WO2021/185810
PCT Pub. Date: Sep. 23, 2021

(65) Prior Publication Data
US 2023/0181832 A1    Jun. 15, 2023

(30) Foreign Application Priority Data

Mar. 17, 2020  (EP) .................................... 20305280

(51) Int. Cl.
*A61M 5/178*    (2006.01)
*A61M 5/28*    (2006.01)
(Continued)

(52) U.S. Cl.
CPC ............ *A61M 5/286* (2013.01); *A61M 5/284* (2013.01); *A61M 2005/1787* (2013.01);
(Continued)

(58) Field of Classification Search
CPC ............ A61M 5/286; A61M 2005/287; A61M 5/31596; A61M 5/284; A61M 2005/3128; A61M 2005/3132; A61M 5/285
See application file for complete search history.

(56) References Cited

U.S. PATENT DOCUMENTS

2002/0045865 A1    4/2002  Mitomi et al.
2004/0116871 A1    6/2004  Vincent
(Continued)

FOREIGN PATENT DOCUMENTS

EP    0588148 A1    3/1994
EP    1844804 A1    10/2007
(Continued)

*Primary Examiner* — Michael J Tsai
*Assistant Examiner* — Katerina A. Wittliff
(74) *Attorney, Agent, or Firm* — The Webb Law Firm (57) ABSTRACT The present disclosure relates to a stopper configured to be positioned inside a barrel of an injection device for injecting at least one composition, said stopper including:
a gasket including a proximal end, a distal end, a lateral wall, and a through hole extending from the proximal end to the distal end,
an insert inserted in the through hole,
wherein the stopper is adapted to deform between:
a closed configuration wherein the gasket cooperates with the insert to hermetically close the through hole, for preventing flow of the composition between the proximal end and the distal end of the gasket, and
an open configuration wherein the gasket cooperates with the insert to open a fluidic pathway in the through hole between the proximal end and the distal end of the gasket for allowing flow of the composition.

6 Claims, 11 Drawing Sheets (51) Int. Cl.
*A61M 5/31* (2006.01)
*A61M 5/315* (2006.01)

(52) U.S. Cl.
CPC ............. *A61M 2005/287* (2013.01); *A61M 2005/3128* (2013.01); *A61M 5/31596* (2013.01)

(56) References Cited

U.S. PATENT DOCUMENTS

| | | | |
|---|---|---|---|
| 2005/0245880 A1* | 11/2005 | Howlett | A61M 5/285 604/231 |
| 2009/0088724 A1 | 4/2009 | Chebator et al. | |
| 2012/0265171 A1 | 10/2012 | Thorne, Jr. et al. | |
| 2014/0228746 A1* | 8/2014 | Bartlett, II | A61J 1/2093 604/220 |
| 2016/0067144 A1* | 3/2016 | Chang | A61M 5/1409 604/92 |
| 2017/0232202 A1 | 8/2017 | Yotsutsuji | |
| 2020/0155764 A1 | 5/2020 | Kakiuchi et al. | |
| 2020/0215269 A1 | 7/2020 | Yotsutsuji | |

FOREIGN PATENT DOCUMENTS

| | | |
|---|---|---|
| GB | 1448108 | 9/1976 |
| JP | 2004344639 A | 12/2004 |
| JP | 200513315 A | 1/2005 |
| JP | 2009505794 A | 2/2009 |
| JP | 200982715 A | 4/2009 |
| JP | 2015507997 A | 3/2015 |
| KR | 101909761 B1 | 10/2018 |
| WO | 0211793 A1 | 2/2002 |
| WO | 02076534 A1 | 10/2002 |
| WO | 2007027585 A2 | 3/2007 |
| WO | 2013124669 A1 | 8/2013 |
| WO | 2015031677 A1 | 3/2015 |
| WO | 2016056149 A1 | 4/2016 |
| WO | 2019043784 A1 | 3/2019 |

* cited by examiner

STOPPER FOR A MEDICAL INJECTION DEVICE

CROSS-REFERENCE TO RELATED APPLICATIONS

This application is the United States national phase of International Application No. PCT/EP2021/056630 filed Mar. 16, 2021, and claims priority to European Patent Application No. 20305280.8 filed Mar. 17, 2020, the disclosures of which are hereby incorporated by reference in their entirety.

BACKGROUND OF THE DISCLOSURE

Field of the Disclosure

The disclosure relates to a stopper for a medical injection device, and a medical injection device comprising said stopper, for injecting at least one composition.

Description of Related Art

Prefilled injection devices are common containers to deliver drugs or vaccines to patients and include syringes, cartridges and autoinjectors or the like. They usually comprise a plunger stopper in gliding engagement into a container, the container being filled with a pharmaceutical composition in order to provide the practitioners with a ready-to-use injection device for patients.

A container has a substantially cylindrical shape, and comprises a proximal end able to be stoppered by a plunger stopper, a distal end wherein the pharmaceutical composition is expelled from the container, and a lateral wall extending between the proximal end and the distal end of the container. In practice, the plunger stopper is aimed at moving, upon the pressure exerted by a plunger, from a proximal end of the container towards the distal end of the container, thereby expelling the drug contained in the container.

Prefilled injection devices are widely known and used, and can be used to carry out the injection of a plurality of compositions to a patient. In such case, the container comprises two chambers, including a first chamber adapted to contain a first composition and a second chamber adapted to contain a second composition. The two chambers are separated by a second stopper, usually referred to as a plug or a diaphragm, that prevents the compositions from passing from one chamber to the other and mixing.

The document WO 02/076534 discloses a device for dispensing two visco-elastic solutions. The device comprises a mobile diaphragm that separates two chambers, each containing a solution. The mobile diaphragm is provided with an opening of a small diameter that is sufficient to prevent the mixing of the two solutions before the first solution has been injected, while allowing subsequent injection of the second solution.

This document also discloses to pass the second solution through the mobile diaphragm, via an opening formed in the diaphragm itself. In order to ensure the sealing of the first chamber in view of the second solution the opening has a small diameter. This renders the injection of the second solution difficult to carry out, due to the force that needs to be applied onto the plunger for passing said solution through the opening and expelling it.

Such drawback is especially important when the composition has a high viscosity, which is usually the case for visco-elastic solutions, and/or when the injection is carried out manually by a user that cannot push on the plunger strongly enough with his fingers. When healthcare professionals perform repetitive injections of viscous pharmaceutical compositions to patients, the repetition of the same gesture may also cause repetitive strain injuries.

The document EP 1 844 804 discloses a multi-chamber syringe, comprising a barrel and a plug that separates two chambers, each containing a solution. The plug comprises two flanges adapted to contact the inner surface of the barrel. The proximal flange is provided with an eccentric protrusion that extends in the distal direction. At the end of the injection of the first solution, the eccentric protrusion abuts the distal end of the barrel, which induces a pivoting of the plug relative to the barrel. The second solution may thereby pass through a space formed between each of the two flanges of the plug and the inner surface of the barrel, and through a fluidic path formed on the lateral wall of the plug between the flanges. Performing injections with this syringe also requires an important effort from the user.

Moreover, the sealing of the two chambers provided by the plug may not be sufficient to prevent mixing of the two solutions during the injection of the first solution.

Another problem that is not solved by any of the preceding documents concerns the dead volume. At the end of the injection of the second solution, in the more distal chamber, a small volume of the second solution remains in the chamber. This small volume is called the dead volume. The dead volume has to be taken into account when a very precise volume of solution has to be injected, which requires additional calculations, and may result in errors in the volume of solution that has been effectively injected. This small volume may also be costly for pharmaceutical industries.

SUMMARY OF THE DISCLOSURE

The disclosure aims to provide a stopper for a medical injection device, and an injection device comprising said stopper, for injecting at least one composition, preferably for sequentially injecting at least two compositions, which may be pharmaceutical compositions, that overcome the drawbacks of the known devices.

The disclosure especially aims to provide such a stopper and injection device that allow the user to easily carry out injection of the second composition contained in the barrel of the injection device, as well as ensuring an optimal sealing for preventing the two compositions from mixing before the first composition has been entirely injected.

The disclosure also aims to provide such a stopper which presents a lower volume in comparison to the stoppers of the prior art, and which allows decreasing the dead volume of the injected composition.

To this end, one object of the disclosure is a stopper configured to be positioned inside a barrel of an injection device for injecting at least one composition, said stopper comprising:
 a gasket comprising a proximal end, a distal end, a lateral wall, and a through hole extending from the proximal end to the distal end,
 an insert inserted in the through hole,
 wherein the stopper is adapted to deform between:
 a closed configuration wherein the gasket cooperates with the insert to hermetically close the through hole, for preventing flow of the composition between the proximal end and the distal end of the gasket, and an open configuration wherein the gasket cooperates with the insert to open a fluidic pathway in the through hole between the proximal end and the distal end of the gasket for allowing flow of the composition.

In some embodiments, the stopper comprises the following features:
the proximal end of the gasket comprises a membrane,
the insert comprises an inner chamber having a distal opening and at least one lateral opening,
the gasket comprises a cavity extending around each lateral opening of the insert, and:
in the closed configuration, the membrane cooperates with the insert to close the cavity, for preventing flow of the composition between the proximal end and the distal end of the gasket, and
in the open configuration, the membrane deforms toward the cavity under a positive difference of pressure between the composition situated proximally from the proximal end of the gasket and a fluid present distally from the distal end of the gasket exerted onto said membrane to open the fluidic pathway between the proximal end of the gasket, the cavity, the inner chamber and the distal end of the gasket.

In some embodiments, the gasket comprises an inner groove and the insert comprises a flange extending from its lateral wall and inserted in the inner groove of the gasket for retaining axially the insert relative to the gasket.

In some embodiments, the stopper comprises the following features:
in the closed configuration, an outer surface of the insert sealingly engages an inner surface of the through hole, for preventing flow of the composition between the proximal end and the distal end of the gasket, and a protruding portion of the insert protrudes distally from the distal end of the gasket, and
in the open configuration, the protruding portion of the insert is configured to abut a distal end of the inside of the barrel of the injection device, and the outer surface of the insert disengages the inner surface of the through hole to open the fluidic pathway between the insert and the barrel, for allowing flow of the composition between the proximal end and the distal end of the gasket.

In some embodiments, the insert is in the form of a pin having an elongated cylindrical or frustoconical body.

In other embodiments, the insert is in the form of a ball.

In some embodiments, the protruding portion of the insert comprises two legs, preferably three legs, that protrude distally from the ball.

In some embodiments, in the open configuration, the protruding portion of the insert is configured to abut against the inner wall of the barrel of the injection device.

In some embodiments, a protruding portion of the barrel protrudes proximally from the distal end of the inner wall of the barrel of the medical injection device and:
in the closed configuration, an outer surface of the insert sealingly engages an inner surface of the through hole, for preventing flow of the composition between the proximal end and the distal end of the gasket,
in the open configuration, the protruding portion of the barrel abuts a proximal end of the insert, and the outer surface of the insert disengages the inner surface of the though hole to open the fluidic pathway between the insert and the barrel, for allowing flow of the composition between the proximal end and the distal end of the gasket.

In some embodiments, the gasket comprises a holder fixedly inserted in the gasket and comprising the through hole adapted to receive the insert.

Said gasket may comprise an inner groove, and the holder comprises a lateral wall and a flange extending from its lateral wall, the flange being inserted in the inner groove of the gasket for retaining axially the holder relative to the gasket.

In some embodiments, the lateral wall of the gasket comprises one or more ribs extending from thereon, said ribs being adapted to contact an inner surface of the barrel.

Another object relates to a medical injection device for injecting at least one composition, comprising:
a barrel extending from a proximal end to a distal end,
a plunger rod adapted to be translationally movable inside the barrel,
a stopper as described above, arranged between the distal end of the barrel and the plunger rod, adapted to be translationally movable inside the barrel, wherein the lateral wall of the stopper sealingly engages an inner surface of the barrel.

In some embodiments, said medical injection device is adapted to sequentially inject two compositions, the stopper separates two chambers of the barrel including a first chamber between the stopper and the distal end of the barrel containing a first composition, and a second chamber between the stopper and the plunger rod containing a second composition.

BRIEF DESCRIPTION OF THE DRAWINGS

Further features and advantages of the disclosure will become apparent from the detailed description to follow, with reference to the appended drawings, in which.

The reference signs identical from one figure to another one designate similar elements or elements fulfilling the same function. As a result, said elements may not be described completely again.

The figures are only intended to illustrate examples of embodiments of the stopper but are not intended to be limitative. In particular, features of various embodiments may be combined whenever technically feasible.

DETAILED DESCRIPTION

The disclosure relates to a stopper configured to be positioned inside a barrel of an injection device for injecting at least one composition, preferably for sequentially injecting at least two compositions. Such injection device is particularly suited for performing the injection of pharmaceutical compositions by a healthcare professional to a patient or by the patient himself in the case of a self-injection. An embodiment of the medical injection device is illustrated in FIG. 3, and will be further described in the following of the present text.

The composition is a fluid, and may be a liquid such as a pharmaceutical composition, a pharmaceutical drug, a vaccine, etc. When the barrel is filled with said composition, gas may be present in said barrel (under the form of small bubbles) such as air, nitrogen, or another gas or mixture thereof.

The stopper 1 comprises a gasket 10 and a pin 50. The pin is configured to be inserted in the gasket, and the stopper is configured to be inserted in an injection device.

Figure 3:
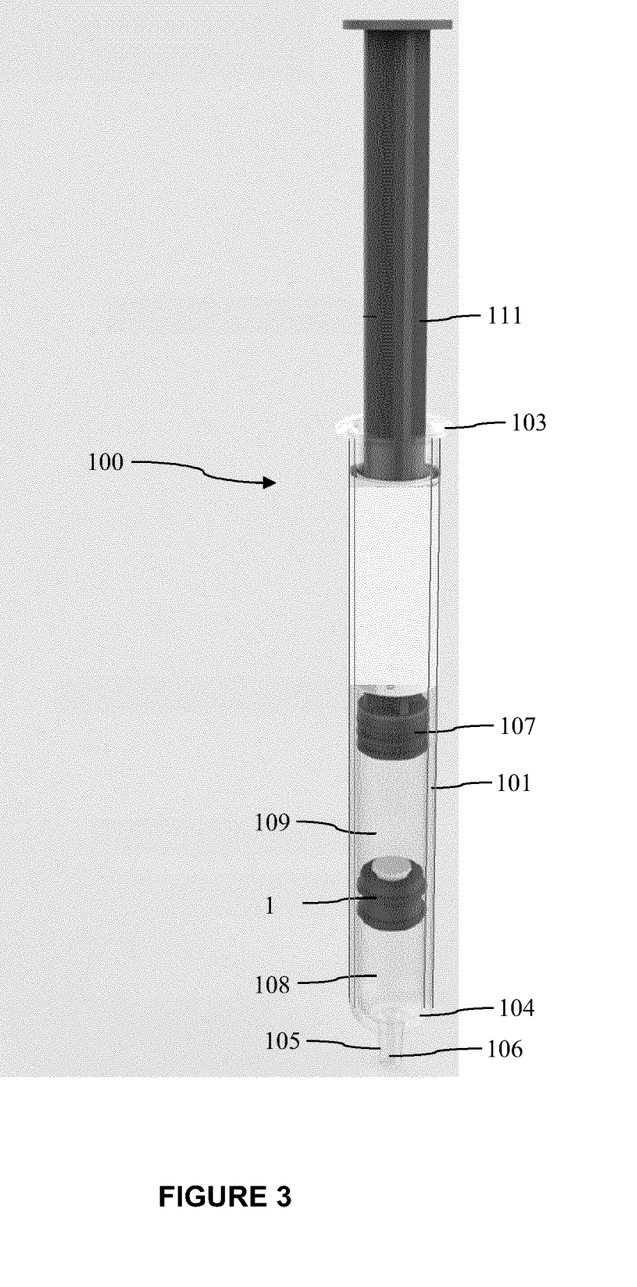
FIG. 3 is a perspective general view of a medical injection device comprising the stopper of FIG. 1.

In reference to FIG. 3, the injection device 100 is a syringe comprising a barrel 101 that extends from a proximal end 103 to a distal end 104. The distal end is provided with a tip 105 which encloses a channel 106 for the passage of a composition. The stopper 1 is configured to be positioned inside the barrel 101 of said injection device 100 for injecting at least one composition, and preferably sequentially injecting at least two compositions.

The injection device 100 comprises a plunger rod 111 fixed to a plunger stopper 107 adapted to be translationally movable inside the barrel for injecting a composition.

Figure 1:
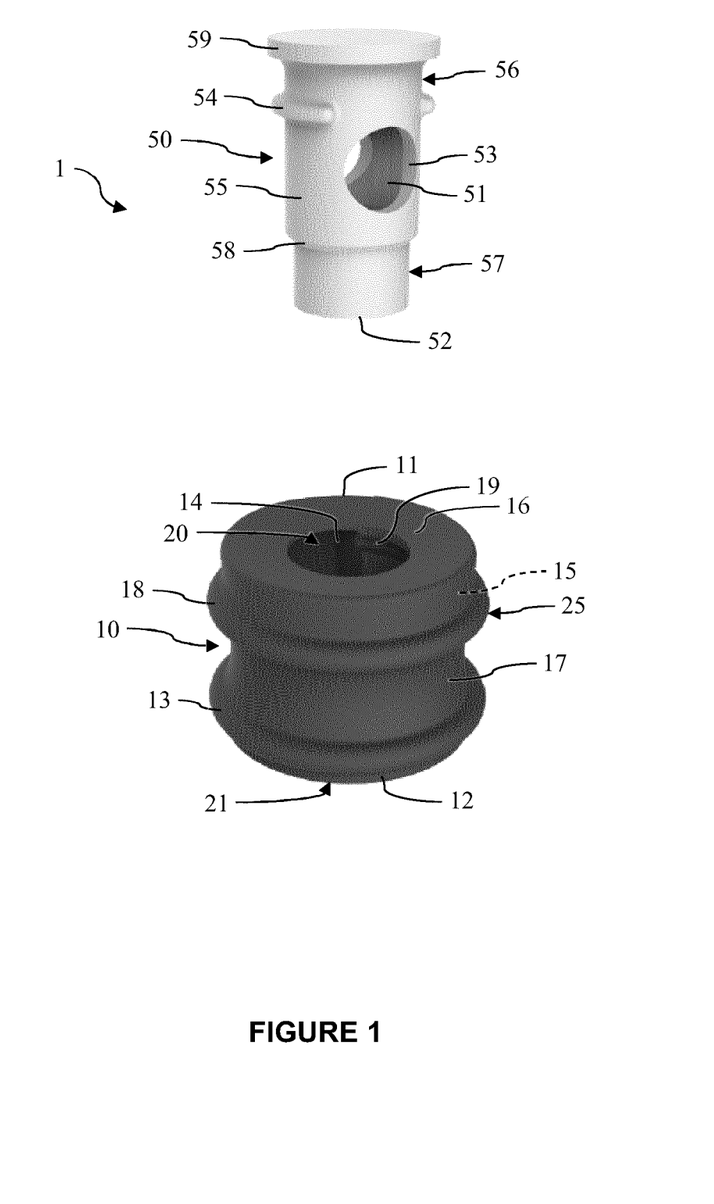
FIG. 1 is a perspective general view of the gasket and the insert which form the stopper according to a first embodiment of the disclosure when assembled.
Figure 2:
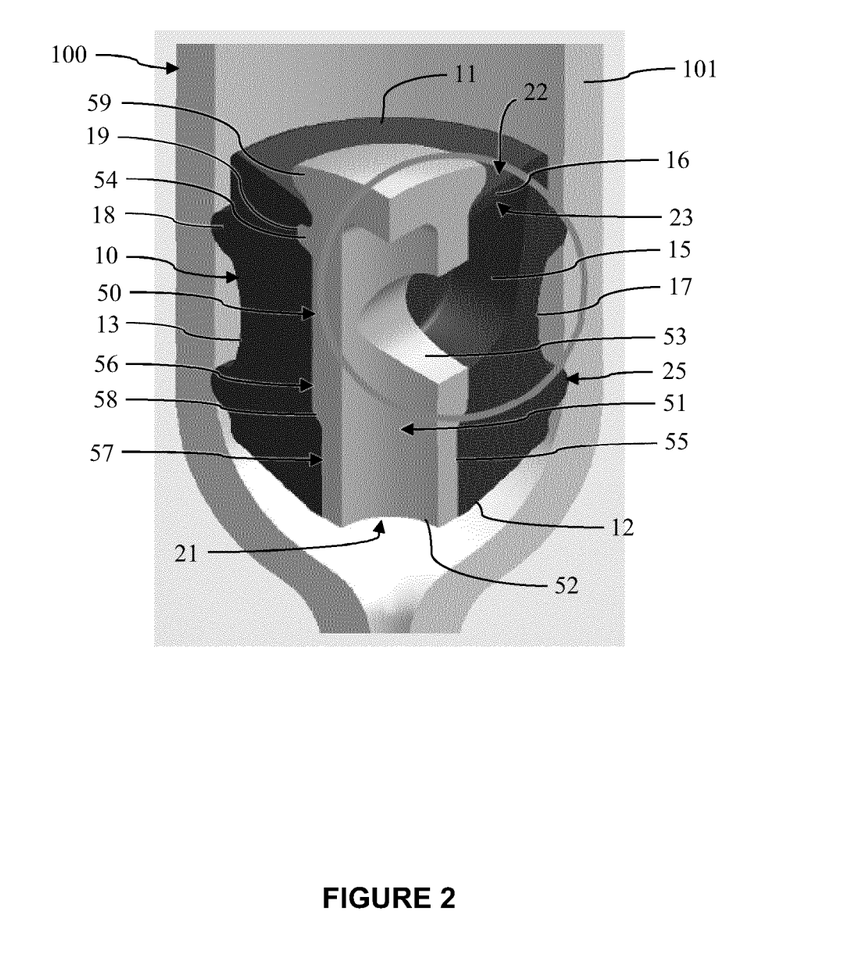
FIG. 2 is a perspective cross-sectional view of stopper of FIG. 1, wherein the gasket and the insert are assembled.

An embodiment of the stopper 1 is illustrated in FIG. 1, wherein the gasket 10 and the pin 50 are separated from each other, and in FIG. 2 wherein the pin 50 is inserted in the gasket 10, the stopper thus being ready to be used.

The gasket 10 has a substantially cylindrical shape, which corresponds to the shape of the barrel 101 of the injection device, such as a syringe, in which said stopper is intended to be inserted.

The gasket comprises a proximal end 11, a distal end 12, and a lateral wall 13 that extends between the proximal wall and the distal wall.

The lateral wall 13 delimits a through hole 14 that extends from the proximal end 11, where it forms a proximal inlet 20, to the distal end 12 where it forms a distal outlet 21. The through hole has a substantially cylindrical or frustoconical shape.

The gasket 10 is axially symmetrical with respect to a longitudinal axis passing in the middle of the through hole 14.

The proximal end 11 of the gasket 10 comprises a membrane 16, which comprises a proximal face 22 and a distal face 23.

The membrane 16 extends radially inwardly from the lateral wall 13 of the gasket, and partially covers the through hole 14 at the proximal inlet 20.

Advantageously, the membrane 16 of the gasket may have a thickness comprised between 0.1 mm and 1.0 mm. The stopper may be used in an injection device having an injection volume comprised between 1 ml and 20 ml, preferably 1 ml to 3 ml.

The lateral wall 13 comprises an outer sealing surface 25 configured to sealingly engage the inner wall of the barrel.

The sealing surface 25 is continuous, which means that it extends continuously along the circumference of the gasket 10 and forms a ring. Since the continuous surface extends between the outer face of the lateral wall of the stopper 1 and the inner surface 102 of the barrel of the medical container, any passage of a composition between the stopper 1 and the barrel 101 is prevented. Optimal sealing is thus ensured.

According to a preferred embodiment, the sealing surface 25 may comprise one or more sealing ribs 18. Each rib 18 extends outwardly from the lateral wall 13 of the gasket and is adapted to contact an inner surface 102 of the barrel. The number of ribs as well as the dimensions of each rib, such as height, width, and the distance between two adjacent ribs, may be adapted to further optimize the sealing depending on the dimensions of the gasket and the barrel.

The presence of one or more ribs reduces the contact surface between the lateral wall 13 of the gasket and the inner surface 102 of the barrel of the injection device, compared to a straight lateral wall of the stopper, thus improving the gliding performance of the gasket 10 relative to the barrel 101. As a result, the force that needs to be exerted onto the stopper 1 for displacing it inside the barrel is reduced, which makes the injection easier for the user, and prevents the slip-stick effect that usually results from the sliding of the stopper relative to the barrel. Besides, when a plurality of ribs 18 are present, the greater the distance between the ribs, the greater the stability of the stopper.

The gasket 10 may be made of any material with elastomeric properties usually used to manufacture stoppers for medical injection devices. For example, the gasket may be made of polyisoprene, elastomer, rubber, thermoplastic elastomer, and liquid silicon rubber.

The pin 50 has a substantially cylindrical or frustoconical shape, which corresponds to the shape of the through hole 14 of the gasket, in which said pin is intended to be inserted, thereby forming the stopper 1. The pin 50 may be made in polypropylene.

The pin 50 comprises a lateral wall 55 that delimits an inner chamber 51, which forms a hollow volume. The inner chamber 51 has a distal opening 52 and at least one lateral opening 53 in fluidic relationship with each other. In FIGS. 1 and 2, the distal opening 52 and the at least one lateral opening 53 are circular, but of course other shapes are possible.

Preferably, the inner chamber comprises from two to four lateral openings. According to a preferred embodiment, which is the one illustrated in FIGS. 1 and 2, the pin 50 comprises two lateral openings 53 diametrically opposite to one another relative to the inner chamber 51.

The pin may comprise a flange 54 extending from its lateral wall 55, along the whole circumference of the lateral wall or only a part of it. The flange is adapted to be inserted in an inner groove 19 provided on the inner surface of the lateral wall 13 of the gasket. In that way, when the pin 50 is inserted in the gasket 10, said pin is retained axially relative to the gasket. The flange 54 may be continuous or discontinuous.

For the same purpose, the pin 50 may comprise two portions, a proximal portion 56 and a distal portion 57, where the distal portion has a smaller diameter than the proximal portion. The diameter of the through hole 14 of the gasket 10 is also reduced in the area of the distal end so as to match that of the distal portion of the pin. In that way, the pin 50 is retained axially in the distal direction relative to the gasket 10.

A chamfer 58 advantageously smooths the angle between the proximal and the distal portions.

The pin 50 may comprise a head 59 that has a greater diameter than the rest of the pin. Hence, when the pin 50 is inserted in the gasket 10, the pin is retained axially in the distal direction relative to the gasket thanks to the abutment of the head 59 against the proximal end 11 of the gasket 10.

In some embodiments, the inner surface of the gasket comprises bumps situated on the proximal end of the gasket to avoid that the insert moves proximally.

In reference to FIG. 2, the gasket 10 may further comprise a cavity 15 that extends in the gasket around the lateral opening 53 of the pin. When the pin 50 comprises two lateral openings 53, the gasket 10 comprises two cavities 15, both extending in the gasket around a corresponding lateral opening 53 of the pin.

More precisely, the cavity 15 communicates with the lateral opening 53.

As a result, a fluidic pathway, called first fluidic pathway, is provided between the distal end 12 of the gasket, the inner chamber 51 of the pin, and the cavity 15. This first fluidic pathway leads to the membrane 16 of the gasket.

The membrane forms a valve configured to open or close the cavity 15 depending on a positive difference of pressure between the composition situated proximally from the proximal end 11 of the gasket 10 and the fluid present distally from the distal end 12 of the gasket exerted onto said membrane.

The gasket 10 is deformable between a closed configuration and an open configuration, thereby allowing or preventing a composition that is located in the proximal side of the stopper 1 from entering said gasket via the membrane 16 and flowing through the first fluidic pathway up to the distal side of the stopper 1.

In the closed configuration, the membrane 16 cooperates with the pin 50 to close the cavity 15. The flow of the composition between the proximal end 11 and the distal end 12 of the gasket is thus prevented.

In the open configuration, the membrane 16 deforms toward the cavity 15, meaning toward the distal direction, under the positive difference of pressure described above. The deformation of the membrane creates a fluidic pathway between the proximal end 11 of the gasket and the cavity 15, called second fluidic pathway, that opens on the first fluidic pathway, and the composition may flow through the stopper for being injected.

The membrane 16 is a one-way membrane, which means that the membrane is configured to preferably deform only when said composition flows in the distal direction, meaning the direction of injection. In other terms, the membrane 16 is configured to open only for allowing the composition to flow through the stopper 1 from the proximal side of the stopper where the composition contacts the proximal face 22 of the membrane, to the distal side of the stopper where the composition contacts the distal face 23 of the membrane. The membrane 16 is configured to remain closed for preventing a composition to flow through the stopper from the distal side of the stopper where the composition contacts the distal face 23 of the membrane to the proximal side of the stopper where the composition contacts the proximal face 22 of the membrane, namely in the proximal direction which is the direction opposite to the direction of injection.

The membrane 16 is configured to remain closed as long as the difference of pressure between the composition situated proximally from the proximal end 11 of the gasket 10 and the fluid present distally from the distal end 12 of the gasket exerted onto said membrane is substantially equal to zero.

The combination of the pin 50 and the cavity 15 within the gasket 10 ensures a good sealing, thereby preventing the two compositions from mixing before the first composition has been entirely injected, while allowing a controlled deformation and opening of the membrane 16.

The deformation of the membrane 16 toward the cavity 15 minimizes the force required to open the valve, thereby facilitating the opening of the valve and the subsequent injection of the composition located proximally from the stopper.

The lateral wall 13 of the gasket may comprise an inner recess 17 that is configured to induce collapsing of the gasket under a mechanical pressure exerted in a distal direction.

The inner recess 17 is preferably an annular groove extending in the lateral wall 13 along the circumference of the gasket 10.

The presence of the inner recess 17 allows the collapsing of the gasket and thus reduces the dead volume, which correspond to the volume of a composition that remains inside the barrel 101 in contact with and distally relative to the stopper after its injection. This enables increasing the total volume of the injected composition, and prevents waste of composition.

As visible on FIG. 3, the stopper 1 is arranged between the distal end 104 of the barrel and the plunger stopper 107, and is translationally movable inside the barrel 101. The stopper 1 separates two chambers of the barrel, including a first, distal, chamber 108 between the stopper 1 and the distal end 104 of the barrel, and a second, proximal, chamber 109 between the stopper 1 and the plunger stopper 107.

The first chamber 108 may contain a first composition, which is intended to be injected first, and the second chamber 109 contains a second composition, which is intended to be injected after the first composition has been injected.

The first and the second compositions may be the same or different. Such compositions may be pharmaceutical, and may be visco-elastic.

Alternatively, only the proximal chamber 109 may comprise a composition. This embodiment is particularly advantageous to physically isolate the composition from the barrel tip, for example to protect a needle arranged in the barrel tip from the composition, or to protect the composition from the material of the needle or from glue in case of a staked needle.

Note that the injection device 100 may comprise more than one stopper, and may be used to inject more than two compositions.

Before injection, the cavity 15 of the gasket 10 is closed by the membrane 16 that engages the lateral wall 55 of the pin 50. This means that when the stopper 1 is inserted in the barrel 101 of the injection device, the membrane 16 is maintained in engagement with the pin 50 under radial compression of the stopper, said stopper being itself subjected to radial compression of the barrel. The membrane 16 closing the cavity 15 prevents the mixing of the first and second compositions, by preventing the first composition from entering the second chamber 109 and the second composition from entering the first chamber 108.

The two or more ribs 9 of the stopper sealingly engage the inner surface 102 of the barrel. Hence, the first and the second composition cannot pass from a chamber to another via a passage between the stopper 1 and the barrel 101.

The functioning of the stopper and the injection device comprising said stopper will now be described in the following of the present text, in reference to FIGS. 4 and 5.

Figure 4:
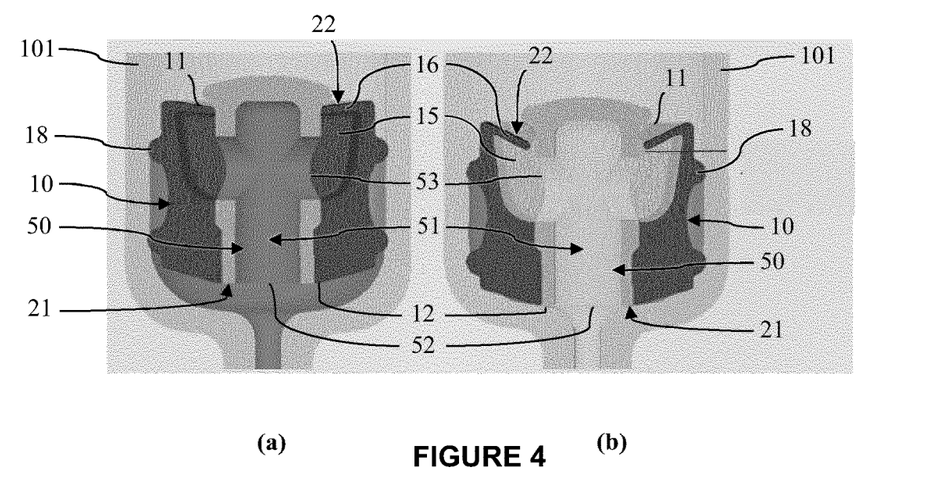
FIG. 4 is an illustration of the functioning of the stopper of FIG. 1, wherein the gasket is (a) in a closed configuration, and (b) in an open configuration.

FIGS. 4(*a*) and 5(*a*) correspond to the configuration of the injection device 100 before injection of the first composition.

In this configuration, the stopper 1 is in a closed configuration wherein the cavity 15 is maintained closed proximally by the membrane 16 of the gasket cooperating with the pin 50 under radial compression of the stopper, and the plunger stopper 107 is in a proximal position. The pressure P1 in the first chamber 108 and the pressure P2 in the second chamber 109 are substantially equal, such that the differential pressure $\Delta P = P2 - P1$ is substantially null, and thus much lower than the force required to open the membrane 16. The cavity 15 thus remains closed.

The user performs the injection of the first composition. The configuration of the injection device 100 is illustrated in FIG. 5(*b*). The force applied to the plunger stopper 107 is transmitted to the second chamber 109 and then to the stopper 1, which results in a force F1 exerted by the second composition onto the proximal face of the membrane 16 of the stopper.

The displacement of the stopper 1 in the distal direction pushes the first composition in the distal direction and said first composition is expelled from the syringe by the channel 106 of the tip.

The displacement of the stopper 1 forces the first composition through the channel for injection. Thus, the stopper 1 is subjected to substantially equal and opposite pressures P1 and P2 respectively exerted by the first composition and the second composition onto the proximal face 22 and the distal face 23 of the membrane 16. During the displacement of the stopper 1, the differential pressure $\Delta P$ may not be substantially null but remains lower than the force required to open the membrane 16.

Figure 5:
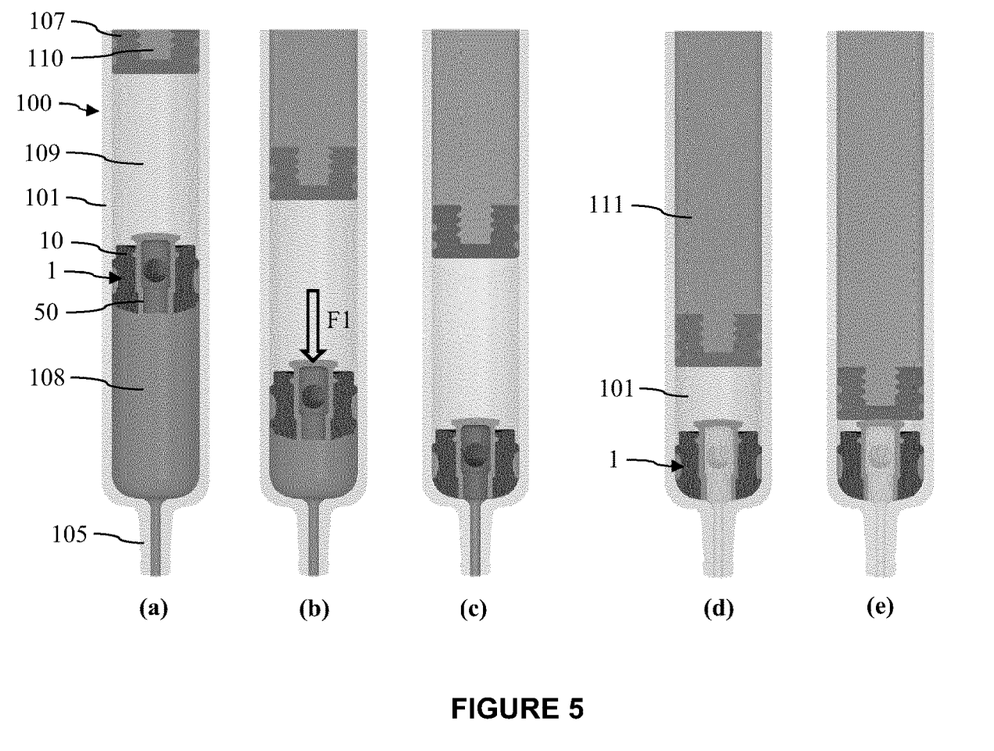
FIG. 5 is an illustration of the functioning of the medical injection device with the stopper of FIG. 1 for injection of two compositions contained therein.

The injection continues until the stopper 1 abuts the distal end 104 of the barrel, as illustrated in FIG. 5(*c*). A fraction of the first composition still remains in the first chamber 108 and in the inner chamber 51 of the stopper 1.

Since the stopper 1 cannot move further distally, the pressure P2 in the second chamber 109 increases and the force differential $\Delta P$ becomes superior to the force required to open the membrane 16. As a result, illustrated in FIG. 4(*b*), the membrane 16 deforms towards the cavity 15, meaning in the direction of injection, thereby opening a second fluidic pathway between the proximal end 11 of the gasket and the cavity 15. The second fluidic pathway opens on the first fluidic pathway, thereby forming a continuous fluidic pathway. The second composition is thus allowed to flow through this continuous fluidic pathway up to the channel for the injection. In this configuration, the stopper is in an open configuration.

As previously explained, at this moment, a fraction of the first composition remains in the inner chamber 51. Accordingly, at the beginning of the injection of the second composition, a fraction of the first composition and a small amount of the second composition may be mixed up since both compositions are injected through the same fluid path.

At the end of the injection of the second composition, illustrated in FIG. 5(*e*), the plunger stopper 107 abuts the stopper 1. A fraction of the second composition remains in the first chamber 108 and in the inner chamber 51.

The stopper 1 collapses under the pressure exerted by the plunger stopper 107, the collapsing being set off thanks to the inner recess. The stopper is thus in a collapsed position. Accordingly, the collapsing of the stopper enables the injection of the second composition which was in the inner chamber 51 and thus strongly reduces the dead volume.

Figure 8:
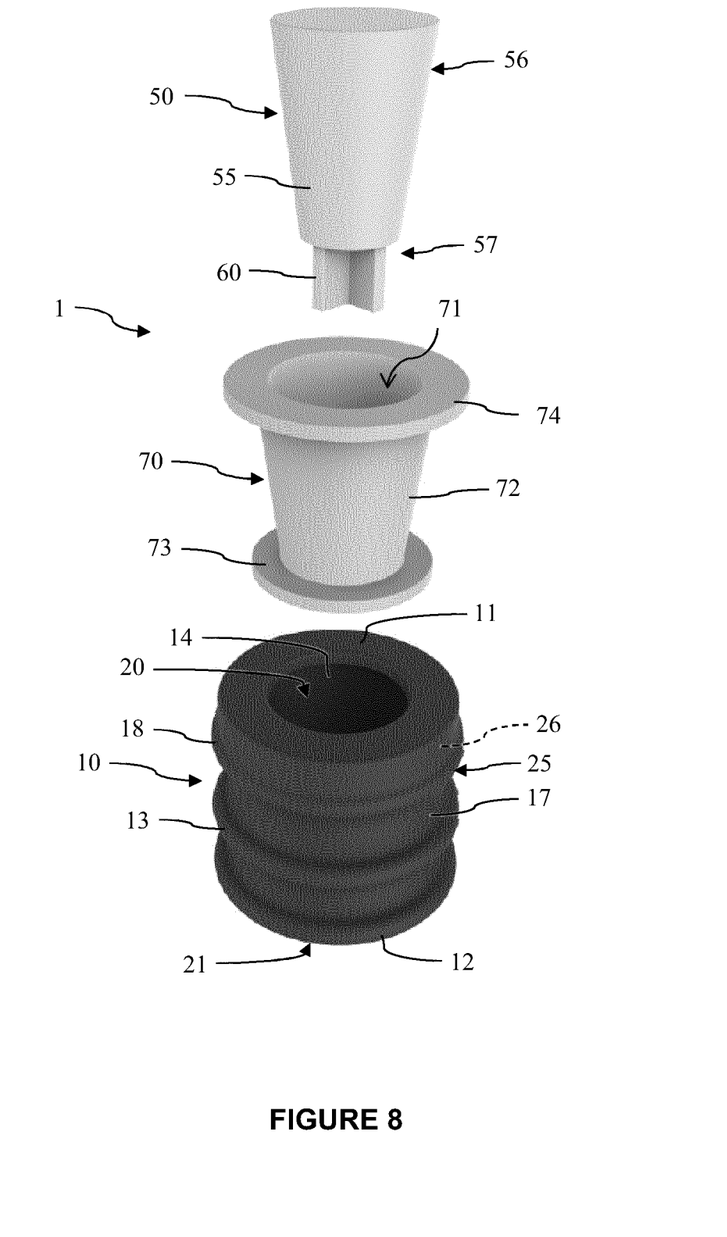
FIG. 8 is a perspective general view of the gasket, the insert, and the holder, which form the stopper according to a second embodiment of the disclosure when assembled.

FIG. 8 illustrates another embodiment of a stopper 1 comprising a gasket 10, a holder 70 and an insert 50. The gasket is configured to receive the holder which is itself configured to receive the insert. The holder is configured to be fixed axially with respect to the gasket, whereas the insert is movable axially in the proximal direction with respect to the holder.

The gasket has already been described above and will not be described in detail again.

The insert 50 has a frustoconical shape tapering in the distal direction, i.e. the proximal portion 56 of the insert has a greater diameter than the distal portion 57. Contrary to the one of FIG. 1, the insert is preferably a solid volume.

The holder 70 comprises a lateral wall 72 defining a frustoconical through hole 71, and distal and proximal flanges 73, 74 extending radially from both ends of the lateral wall 72. The flanges are received in corresponding internal grooves of the gasket to maintain the holder in fixed axial position relative to the gasket.

The lateral wall 55 of the insert 50 fits the internal wall of the through hole 74 of the holder so as to provide a sealing condition.

The insert is however able to move axially in the proximal direction with respect to the holder and the gasket. In this event, when the stopper is in the open configuration, an annular space is opened between the lateral wall of the insert and the internal wall of the holder, thereby creating a fluidic pathway.

Such movement of the insert in the proximal direction may be caused by engagement of a distal portion of the insert comprising a protruding portion 60 which extends distally from the distal end 12 of the gasket and an inner surface of the distal end of the barrel.

The protruding portion of the insert is configured to avoid obstructing the fluidic path at the distal end of the barrel, in order to allow the composition to be ejected from the barrel. For example, as shown in FIG. 8, the protruding portion may have a cross shape. The cross shape also has the advantage of increasing the stiffness of the insert. However, any other suitable shape could be used as an alternative.

Figure 9:
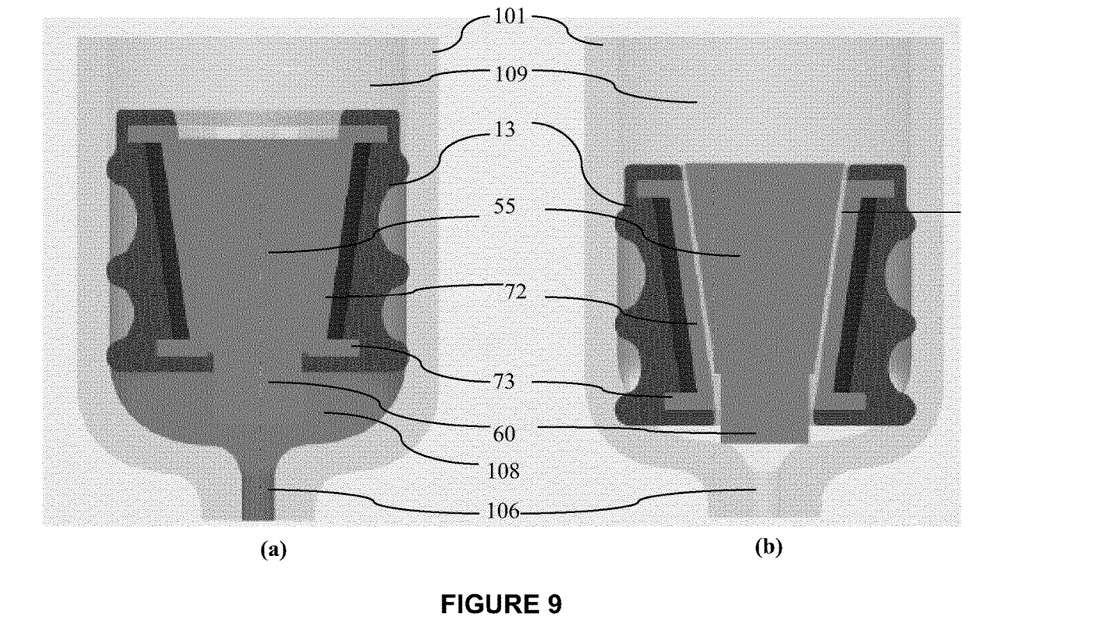
FIG. 9 is an illustration of the functioning of the stopper of FIG. 8, wherein the gasket is (a) in a closed configuration, and (b) in an open configuration.
Figure 14:
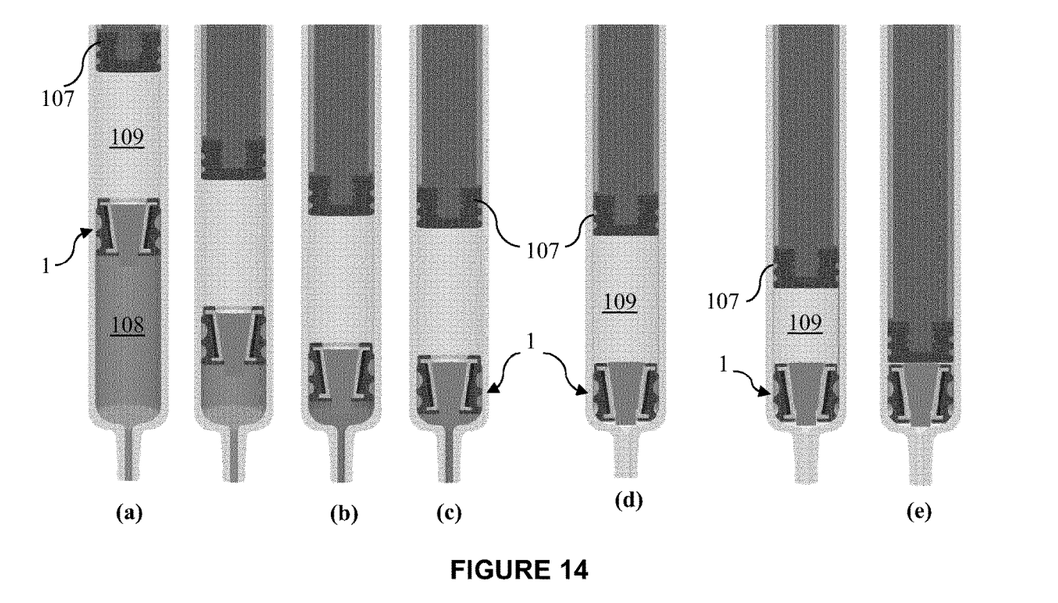
FIG. 14 is an illustration of the functioning of the medical injection device with the stopper of FIG. 8 for injection of two compositions contained therein.

FIGS. 9(*a*) and 14(*a*) correspond to the configuration of the injection device before injection of the first composition.

In this configuration, the stopper 1 is in a closed configuration with a tight connection between the holder and the insert, and the plunger stopper 107 is in a proximal position. The pressure P1 in the first chamber 108 and the pressure P2 in the second chamber 109 are substantially equal, such that the differential pressure ΔP=P2−P1 is substantially null, and thus much lower than the force required to disengage the insert from the holder.

The user performs the injection of the first composition. The configuration of the injection device is illustrated in FIG. 14(b). The force applied to the plunger stopper 107 is transmitted to the second chamber 109 and then to the stopper 1, which results in a force F1 exerted by the second composition onto the proximal face of insert.

The displacement of the stopper 1 in the distal direction pushes the first composition in the distal direction and said first composition is expelled from the syringe by the channel 106 of the tip. In this configuration, the stopper 1 is still in a closed configuration.

The displacement of the stopper 1 forces the first composition through the channel for injection. Thus, the stopper 1 is subjected to substantially equal and opposite pressures P1 and P2 respectively exerted by the first composition and the second composition onto the proximal face and the distal face of the insert.

As a consequence, the differential pressure ΔP may not be substantially null but remains lower than the force required to disengage the insert from the holder.

The injection continues until the protruding portion 60 of the insert abuts the distal end 104 of the barrel, as illustrated in FIG. 14(c). A fraction of the first composition may still remain in the first chamber 108.

Since the insert cannot move further distally, the pressure P2 in the second chamber 109 increases and the difference of pressure ΔP becomes superior to the force required to disengage the insert from the holder. As a result, illustrated in FIGS. 9(b) and 14(d), the holder 70 moves in the distal direction with respect to the insert 50, thereby opening an annular fluidic pathway between the proximal and distal ends of the stopper. The second composition is thus allowed to pass through this fluidic pathway up to the channel for the injection. In this configuration, the stopper is in an open configuration.

At the end of the injection of the second composition, illustrated in FIG. 14(e), the plunger stopper 107 abuts the stopper 1. A fraction of the second composition may remain in the first chamber 108, that corresponds to the dead volume.

In this embodiment of the stopper, the holder allows limiting the radial compression exerted by the gasket onto the insert. As a result, the insert may easily disengage the gasket/holder, which reduces the force to be applied to create the fluidic pathway.

Figure 10:
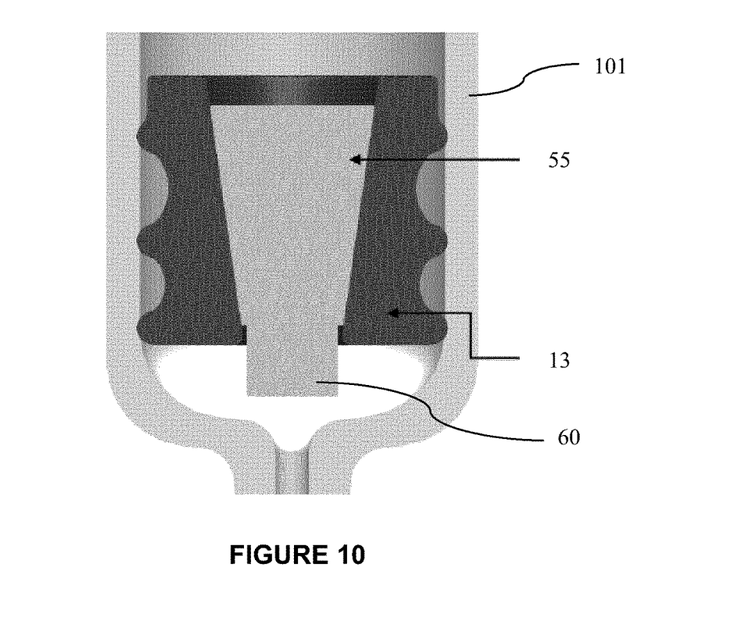
FIG. 10 is a sectional view of an alternative embodiment of the stopper of FIG. 8, without any holder.

However, in an alternative embodiment illustrated in FIG. 10, the holder may be omitted and the insert be directly received in the through hole of the gasket. In this case, the fit between the insert and the gasket has to be accurate during assembly to allow easily opening the fluidic path when the protruding portion of the insert engages the inner surface of the barrel. Omitting the holder allows reducing the number of parts of the stopper and thus reducing its cost.

Figure 11:
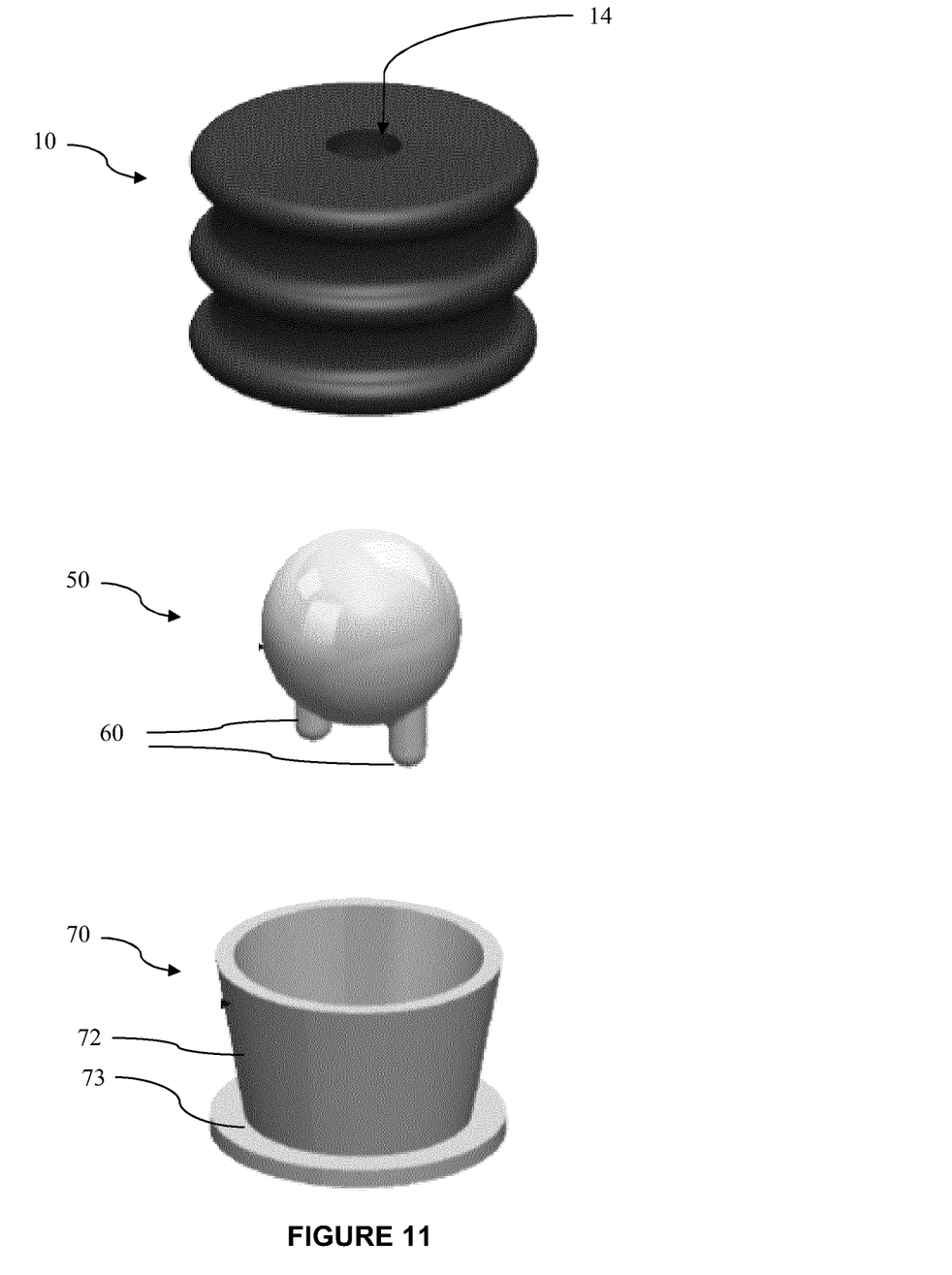
FIG. 11 is a perspective general view of the gasket, the insert and the holder, which form a third embodiment of the stopper when assembled.

FIG. 11 illustrates another embodiment of a stopper comprising a gasket 10, a holder 70 and an insert 50. As compared to the stopper of the FIG. 8, the shape of the insert is different in that it has a spherical body, and a distal protruding portion extending from the spherical body.

Figure 12:
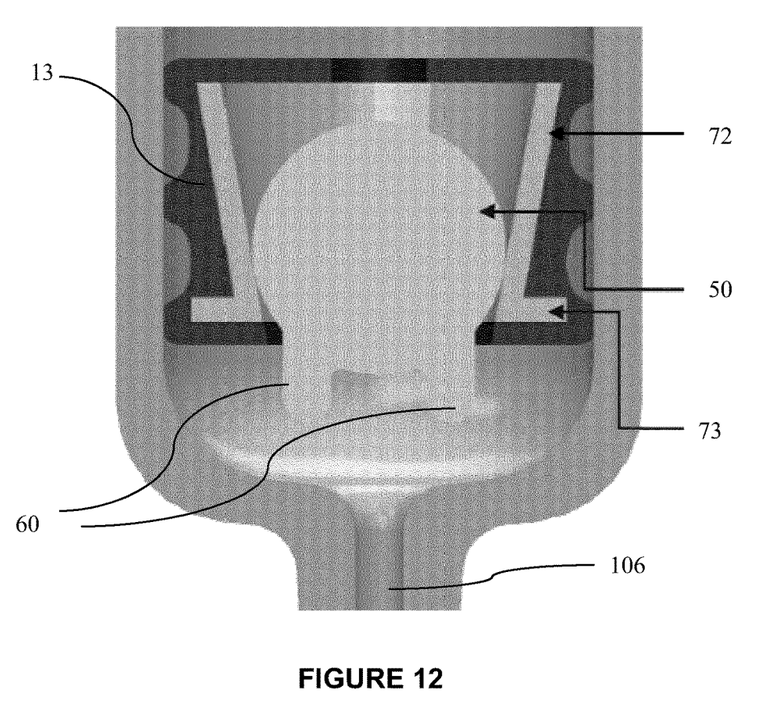
FIG. 12 is a sectional view of the stopper of FIG. 11 in a medical injection device.

As shown in FIG. 12, when the stopper is arranged in the barrel of the injection device in closed position, the outer wall of the spherical body of the insert fits the internal wall of the frustoconical through hole 74 of the holder so as to provide a sealing condition.

The insert is however able to move axially in the proximal direction with respect to the holder. In this event, an annular space is opened between the outer wall of the spherical body of the insert and the internal wall of the holder, thereby creating a fluidic pathway.

Such movement of the insert in the proximal direction may be caused by engagement of the protruding portion 60 of the insert which extends distally from the distal end 12 of the gasket and an inner surface of the distal end of the barrel. In the illustrated embodiment, the protruding portion comprises two legs or three legs. Preferably, the legs are arranged at regular angular intervals around the axis of the stopper. However, alternative shapes may be acceptable provided that they are configured to avoid obstructing the fluidic path at the distal end of the barrel, in order to allow the composition to be ejected from the barrel.

Figure 13:
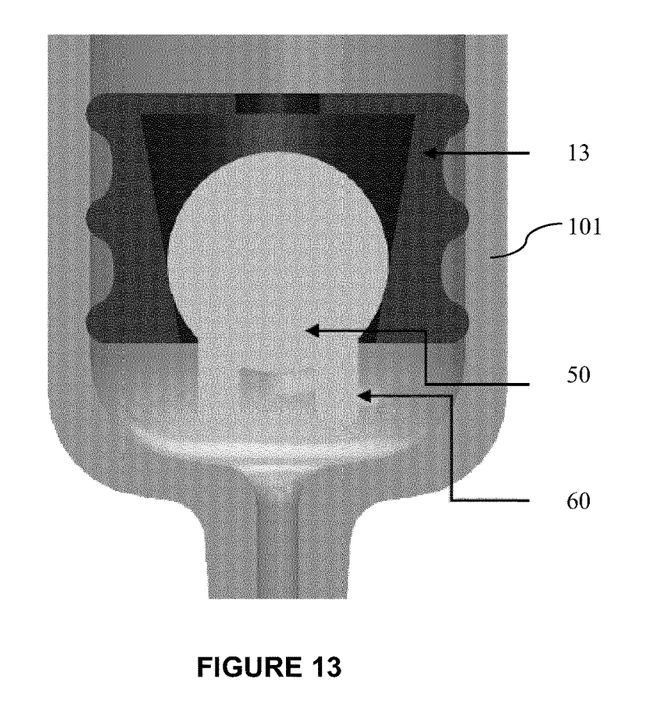
FIG. 13 is a sectional view of an alternative embodiment of the stopper of FIG. 12, without any holder.

As shown in FIG. 13, the holder may be omitted and the insert be received directly in the through hole of the gasket.

In another embodiment, the protruding portion is not arranged on the insert but in the barrel. This may be especially the case if the barrel is made of plastic, since plastic injection molding allows forming complex shapes in or out of the barrel.

The protruding portion extends proximally from the distal end of the inner surface of the barrel. The protruding portion may comprise one or several bumps. Preferably, the protruding portion comprises at least two bumps arranged at regular intervals around the distal channel.

Figure 15:
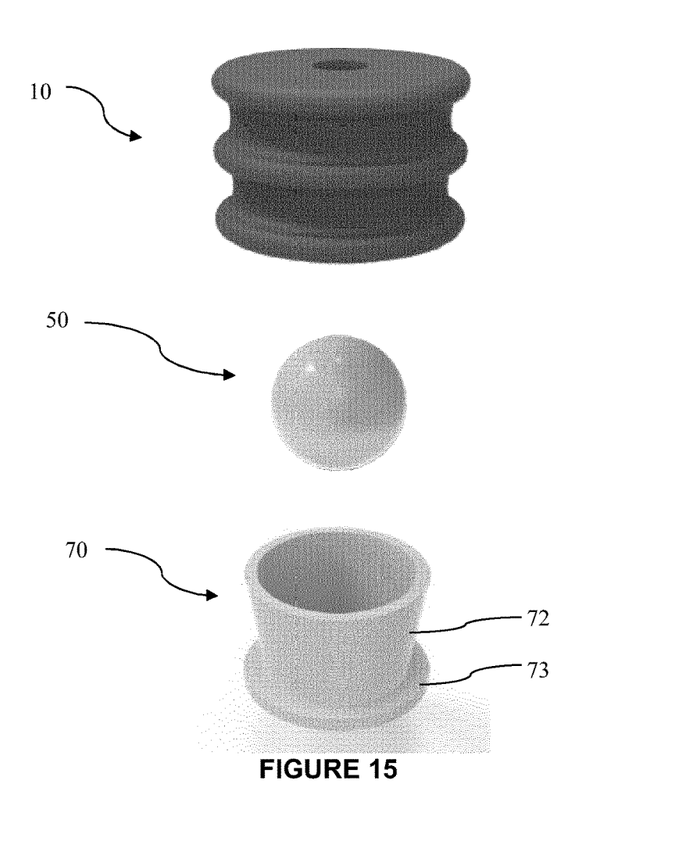
FIG. 15 is a perspective general view of the gasket, the insert and the holder, which form a fourth embodiment of the stopper when assembled.

As shown in FIG. 15, the insert may have a ball shape. The embodiment of FIG. 14 differs from the one of FIG. 11 in that the insert does not comprise the legs 60.

Figure 16:
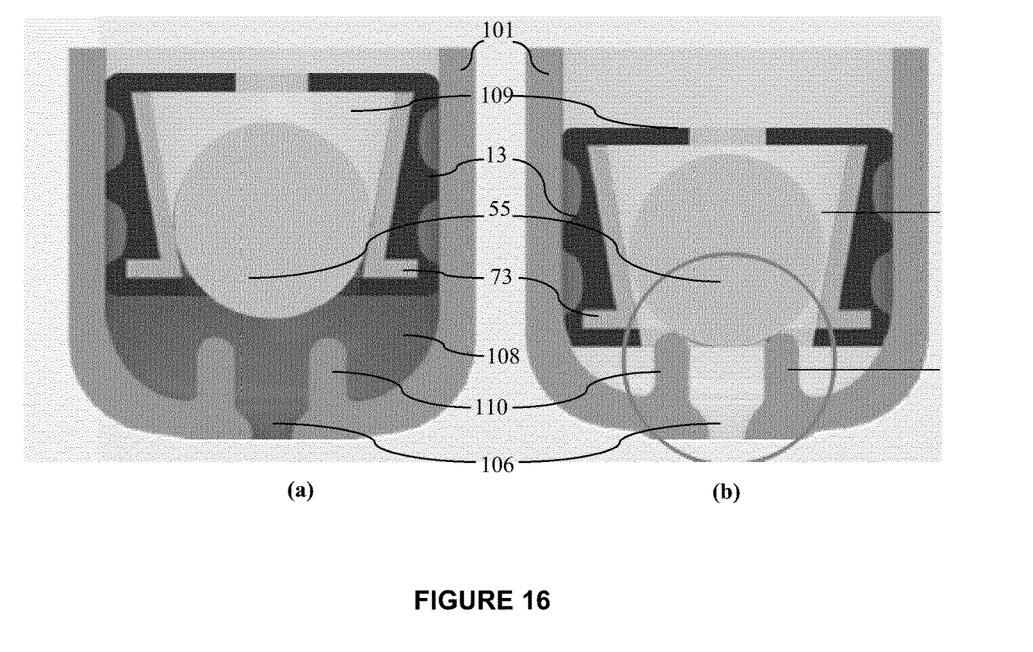
FIG. 16 is an illustration of the functioning of the stopper of FIG. 15, wherein the gasket is (a) in a closed configuration, and (b) in an open configuration.

As shown in FIG. 16(a), when the stopper is arranged in the barrel in a closed position, a small part of the outer surface of the insert protrudes from the distal end of the gasket.

When said outer surface engages the inner bumps 110 formed inside the barrel, around the distal channel, the insert is caused to move proximally relative to the holder, thereby creating a fluidic path between the holder and the insert (see FIG. 16(b)).

Figure 6:
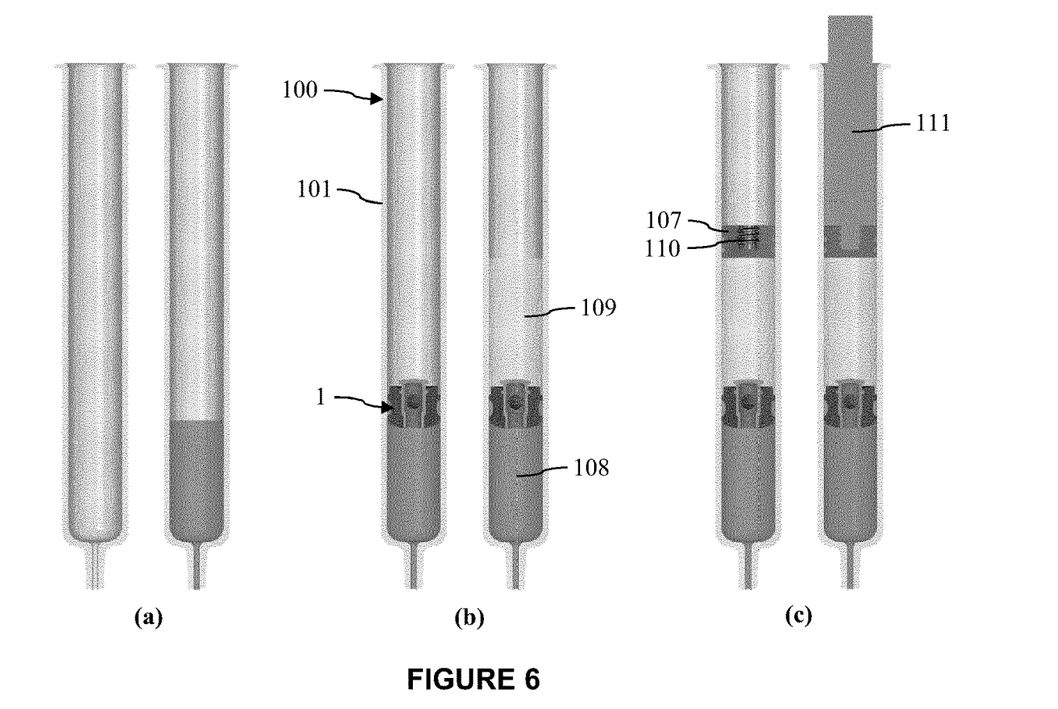
FIG. 6 illustrates a first embodiment of a method for filling the medical injection device including the stopper of FIG. 1 with two compositions intended to be injected.
Figure 7:
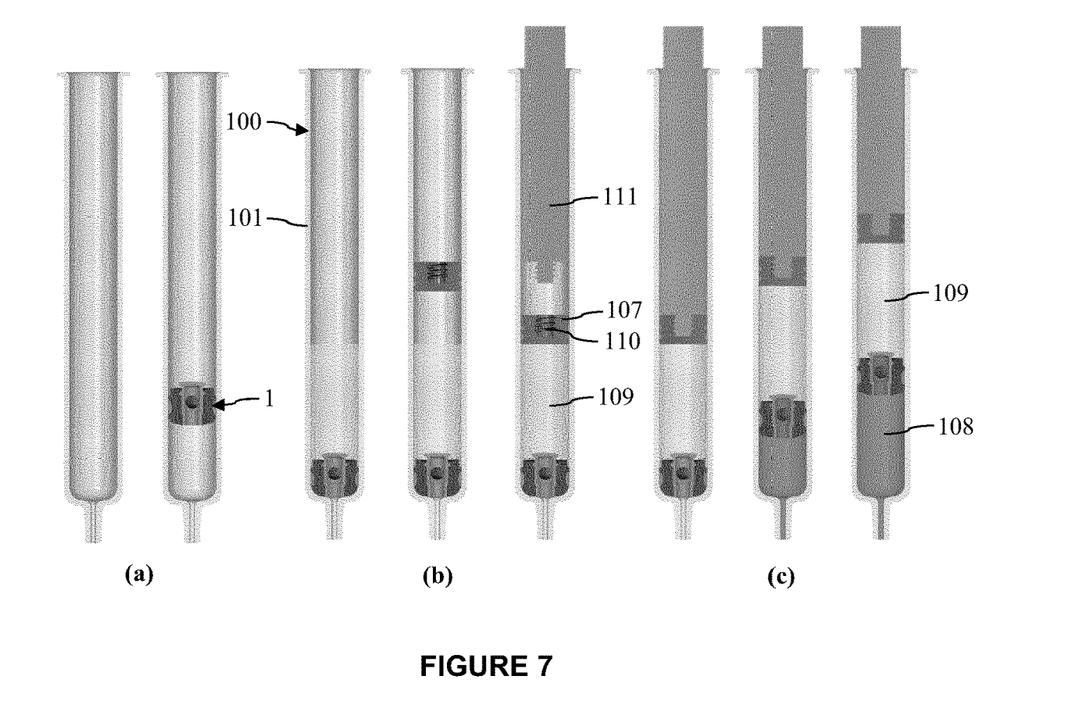
FIG. 7 illustrates a second embodiment of a method for filling the medical injection device including the stopper of FIG. 1 with two compositions intended to be injected.

Concerning the preparation of the medical injection device for an injection to be performed, a first filling method is illustrated in FIG. 6 and a second filling method is illustrated in FIG. 7.

According to the first filling method:
(a) the first composition is introduced in the barrel 101 of the injection device 100;
(b) the stopper 1 is inserted in the barrel to as to contact the first composition, thereby delimiting a first chamber filled with the composition, and a second chamber, and the second composition is introduced in the second chamber of the barrel;
(c) the plunger stopper 107 is introduced in the barrel, and the plunger rod is then positioned in the barrel with its distal end in engagement with the plunger stopper. The injection device is ready for the injection.

According to the second filling method:
(a) the stopper 1 is inserted in the barrel 101 of the injection device 100;
(b) the first composition is introduced in the barrel, in a second chamber, the plunger stopper 107 is introduced in the barrel, and the plunger rod is then positioned in the barrel with its distal end in engagement with the plunger stopper;
(c) the tip of the syringe is immersed in the second composition contained in a recipient, and the second composition is sucked up into a first chamber of the barrel. The injection device is ready for the injection.

The invention claimed is:

1. A stopper configured to be positioned inside a barrel of an injection device for injecting at least one composition, the stopper comprising:
 a gasket comprising a proximal end, a distal end, a lateral wall, and a through hole extending from the proximal end to the distal end,
 an insert inserted in the through hole, the stopper being adapted to deform between:
 a closed configuration wherein the gasket cooperates with the insert to hermetically close the through hole, for preventing flow of the composition between the proximal end and the distal end of the gasket, and
 an open configuration wherein the gasket cooperates with the insert to open a fluidic pathway in the through hole between the proximal end and the distal end of the gasket for allowing flow of the composition,
 wherein:
 the proximal end of the gasket comprises a membrane,
 the insert comprises an inner chamber having a distal opening and at least one lateral opening,
 the gasket comprises a cavity extending around each lateral opening of the insert,
 and
 in the closed configuration, the membrane cooperates with the insert to close the cavity, for preventing flow of the composition between the proximal end and the distal end of the gasket, and
 in the open configuration, the membrane deforms toward the cavity under a positive difference of pressure between the composition situated proximally from the proximal end of the gasket and a fluid present distally from the distal end of the gasket exerted onto the membrane to open the fluidic pathway between the proximal end of the gasket, the cavity, the inner chamber and the distal end of the gasket.

2. The stopper according to claim 1, wherein the gasket comprises an inner groove, and the insert comprises a flange extending from its lateral wall and inserted in the inner groove of the gasket for retaining axially the insert relative to the gasket.

3. The stopper according to claim 1, wherein the insert is in the form of a pin having an elongated cylindrical or frustoconical body.

4. The stopper according to claim 1, wherein the lateral wall of the gasket comprises one or more ribs extending from thereon, said ribs being adapted to contact an inner surface of the barrel.

5. A medical injection device for injecting at least one composition, comprising:
 a barrel extending from a proximal end to a distal end,
 a plunger rod adapted to be translationally movable inside the barrel,
 a stopper according to claim 1, arranged between the distal end of the barrel and the plunger rod, adapted to be translationally movable inside the barrel, wherein the lateral wall of the stopper sealingly engages an inner surface of the barrel.

6. The medical injection device according to claim 5, the medical injection device being adapted to sequentially inject two compositions, wherein the stopper separates two chambers of the barrel including a first chamber between the stopper and the distal end of the barrel containing a first composition, and a second chamber between the stopper and the plunger rod containing a second composition.

* * * * *